(12) United States Patent
Yagasaki

(10) Patent No.: US 11,506,256 B2
(45) Date of Patent: Nov. 22, 2022

(54) METAL ELEMENT FOR CONTINUOUSLY VARIABLE TRANSMISSION AND METHOD OF MANUFACTURE THE SAME

(71) Applicant: HONDA MOTOR CO., LTD., Tokyo (JP)

(72) Inventor: Toru Yagasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 903 days.

(21) Appl. No.: 16/373,886

(22) Filed: Apr. 3, 2019

(65) Prior Publication Data
US 2019/0301566 A1 Oct. 3, 2019

(30) Foreign Application Priority Data
Apr. 3, 2018 (JP) .............................. JP2018-071489

(51) Int. Cl.
| | |
|---|---|
| F16G 5/16 | (2006.01) |
| B21D 53/14 | (2006.01) |
| B21D 22/02 | (2006.01) |
| F16G 5/20 | (2006.01) |
| F16H 9/12 | (2006.01) |

(52) U.S. Cl.
CPC ............. F16G 5/16 (2013.01); B21D 22/02 (2013.01); B21D 53/14 (2013.01); F16G 5/20 (2013.01); F16H 9/12 (2013.01)

(58) Field of Classification Search
CPC .................................. F16G 5/16; B21D 53/14
USPC ........................................................ 474/242
See application file for complete search history.

(56) References Cited

U.S. PATENT DOCUMENTS

| | | | | |
|---|---|---|---|---|
| 4,299,586 | A * | 11/1981 | Van der Hardt Aberson | .............. F16G 5/16 474/201 |
| 4,424,049 | A * | 1/1984 | Braybrook | ............. B21D 53/00 474/272 |
| 4,494,946 | A * | 1/1985 | Wilcox | ..................... F16G 5/16 474/205 |
| 4,525,160 | A * | 6/1985 | Okawa | ...................... F16G 5/16 474/272 |

(Continued)

FOREIGN PATENT DOCUMENTS

| | | |
|---|---|---|
| CN | 102906452 A | 1/2013 |
| CN | 105143713 A | 12/2015 |

(Continued)

OTHER PUBLICATIONS

Office Action dated Aug. 17, 2020, issued in counterpart CN Application No. 201910216564.1, with English translation (12 pages).

(Continued)

*Primary Examiner* — Henry Y Liu
(74) *Attorney, Agent, or Firm* — WHDA, LLP

(57) ABSTRACT

A metal element, which is pressed and punched by a mold, includes: a neck section positioned between a pair of right and left ring slots; an ear section continuous to a radially outer side of the neck section; and a body section continuous to a radially inner side of the neck section. A locking edge extending in a right-left direction is formed at a radially outer end of the front surface of the body section, and the metal element includes a projection section extending in the right-left direction on a back surface of the body section at a position backward of the locking edge.

7 Claims, 13 Drawing Sheets

(56) References Cited

U.S. PATENT DOCUMENTS

| | | | | |
|---|---|---|---|---|
| 4,552,550 A * | 11/1985 | Howerton | F16G 5/166 | 474/201 |
| 4,560,371 A * | 12/1985 | Hattori | F16G 5/16 | 474/201 |
| 4,579,547 A * | 4/1986 | McComber | F16G 5/166 | 474/201 |
| 4,595,387 A * | 6/1986 | Frazier | F16G 5/166 | 474/201 |
| 4,689,038 A * | 8/1987 | Henderson | F16G 5/166 | 474/201 |
| 4,758,211 A * | 7/1988 | Hattori | F16G 5/16 | 474/201 |
| 4,854,926 A * | 8/1989 | Hattori | F16G 5/16 | 474/201 |
| 4,891,039 A * | 1/1990 | Hattori | F16G 5/16 | 474/242 |
| 4,900,296 A * | 2/1990 | Schmidt | F16G 5/18 | 474/242 |
| 5,123,880 A * | 6/1992 | Sekine | F16G 5/16 | 474/244 |
| 5,236,401 A * | 8/1993 | Matsuo | F16G 5/16 | 474/242 |
| 5,346,440 A * | 9/1994 | Smeets | F16G 5/16 | 474/242 |
| 5,374,223 A * | 12/1994 | Hendriks | F16G 5/16 | 474/242 |
| 6,074,317 A * | 6/2000 | Kobayashi | F16G 5/16 | 474/201 |
| 6,120,399 A * | 9/2000 | Okeson | F16H 55/56 | 474/14 |
| 6,283,882 B1 * | 9/2001 | Nonaka | F16G 5/166 | 474/201 |
| 6,334,830 B1 * | 1/2002 | Yagasaki | F16G 5/16 | 474/201 |
| 6,409,620 B1 * | 6/2002 | Yoshida | F16G 5/16 | 474/201 |
| 6,440,025 B1 * | 8/2002 | Ohnuki | F16G 5/16 | 474/242 |
| 6,453,716 B2 * | 9/2002 | Suzuki | B21D 53/14 | 72/329 |
| 6,565,469 B1 * | 5/2003 | Aoyama | F16G 5/16 | 474/240 |
| 6,569,043 B2 * | 5/2003 | Younggren | F16H 55/56 | 474/19 |
| 6,626,782 B1 * | 9/2003 | Ohsono | B21D 53/14 | 474/201 |
| 6,645,104 B2 * | 11/2003 | Suzuki | B21D 53/14 | 474/201 |
| 6,743,129 B1 * | 6/2004 | Younggren | F16H 55/56 | 474/19 |
| 6,904,782 B2 * | 6/2005 | Suzuki | F16G 5/16 | 72/337 |
| 7,076,986 B2 * | 7/2006 | Mutsaers | F16G 5/16 | 83/40 |
| 8,100,797 B2 * | 1/2012 | Prinsen | F16G 5/16 | 474/272 |
| 8,496,551 B2 * | 7/2013 | Mueller | F16H 63/067 | 474/17 |
| 8,668,623 B2 * | 3/2014 | Vuksa | F16H 63/067 | 477/80 |
| 8,950,056 B2 * | 2/2015 | Okubo | B21K 23/00 | 72/336 |
| 9,080,639 B2 * | 7/2015 | Harima | F16G 5/16 | |
| 9,714,690 B2 * | 7/2017 | Yagasaki | F16G 5/16 | |
| 2001/0018843 A1 * | 9/2001 | Suzuki | B21D 53/14 | 72/379.2 |
| 2004/0082417 A1 * | 4/2004 | Smeets | F16G 5/16 | 474/201 |
| 2004/0152550 A1 * | 8/2004 | Van Der Meer | F16G 5/16 | 474/201 |
| 2004/0176202 A1 * | 9/2004 | Sakai | F16G 5/16 | 474/201 |
| 2006/0079366 A1 * | 4/2006 | Kanehara | F16G 5/16 | 474/201 |
| 2007/0072721 A1 * | 3/2007 | Takagi | F16G 5/16 | 474/201 |
| 2008/0305906 A1 * | 12/2008 | Kobayashi | F16G 5/16 | 474/242 |
| 2010/0227721 A1 * | 9/2010 | Kato | F16G 5/16 | 474/242 |
| 2012/0277048 A1 * | 11/2012 | Van Der Sluis | F16G 5/16 | 474/242 |
| 2014/0106919 A1 * | 4/2014 | Harima | F16G 5/16 | 474/242 |
| 2016/0053852 A1 * | 2/2016 | Yagasaki | F16G 5/16 | 474/272 |
| 2016/0102732 A1 * | 4/2016 | Yagasaki | F16G 5/16 | 474/242 |

FOREIGN PATENT DOCUMENTS

| | | |
|---|---|---|
| CN | 106461020 A | 2/2017 |
| JP | 63-199943 A | 8/1988 |
| JP | 63199943 A | 8/1988 |
| JP | 2005054896 A | 3/2005 |
| JP | 3777986 B2 | 5/2006 |
| JP | 2007-192254 A | 8/2007 |
| JP | 4132820 B2 | 8/2008 |
| JP | 2009-052665 A | 3/2009 |
| JP | 2009052665 A | 3/2009 |
| WO | 2012/164639 A1 | 12/2012 |
| WO | 2014/196254 A1 | 12/2014 |

OTHER PUBLICATIONS

Office Action dated Jul. 24, 2019, issued in counterpart JP Application No. 2018-071489 (4 pages).

* cited by examiner

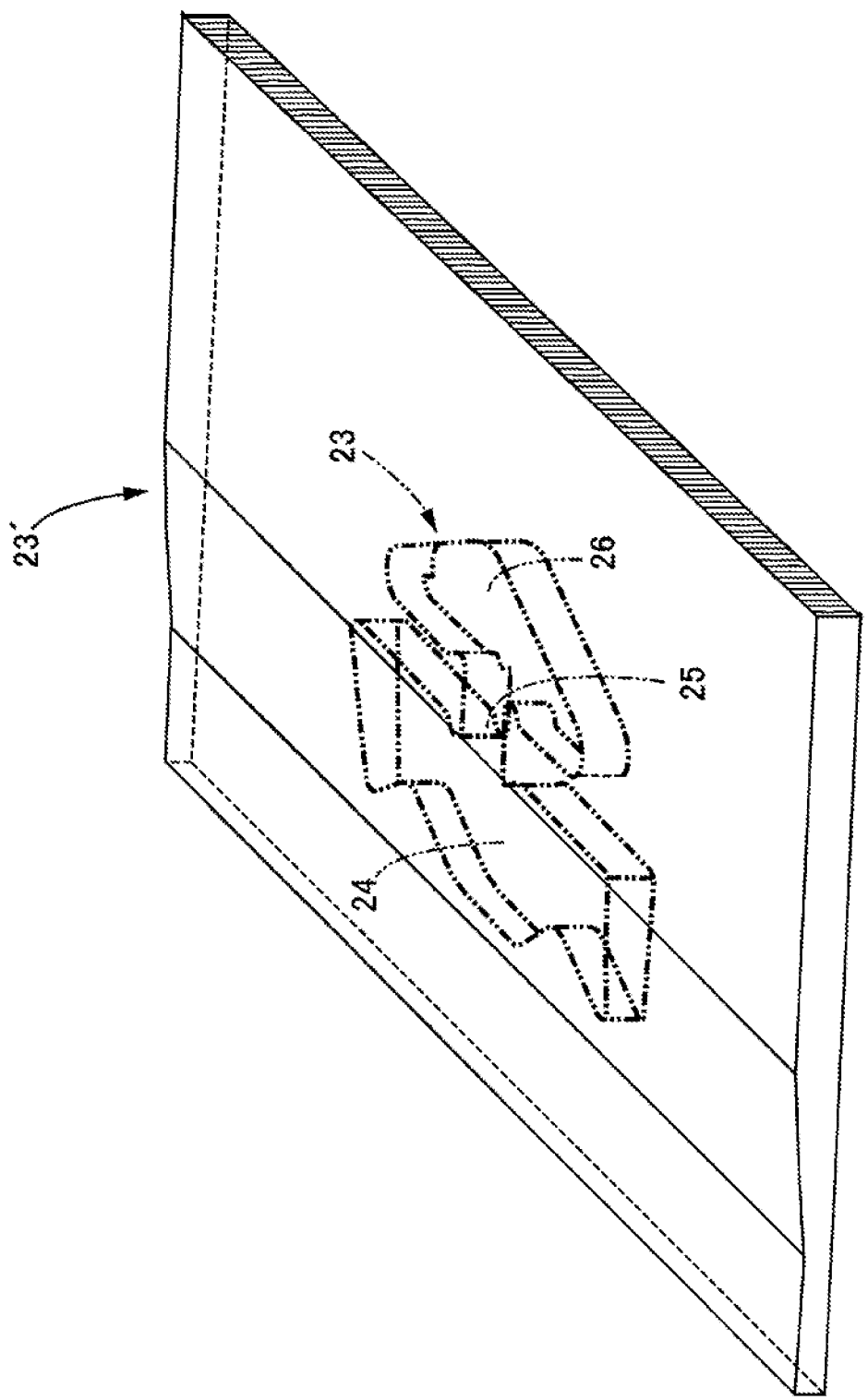

| EMBODIMENT | RELATED ART EXAMPLE |

FIG. 9A
FIG. 9B
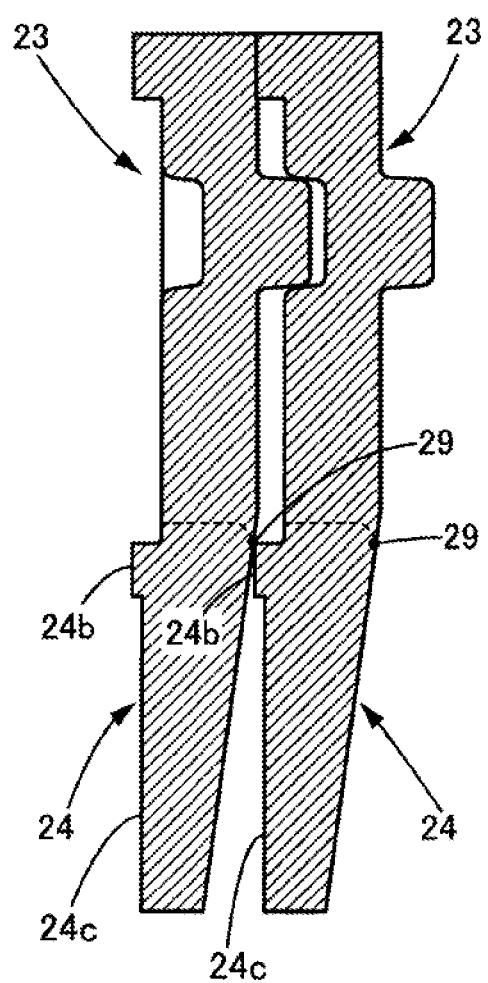
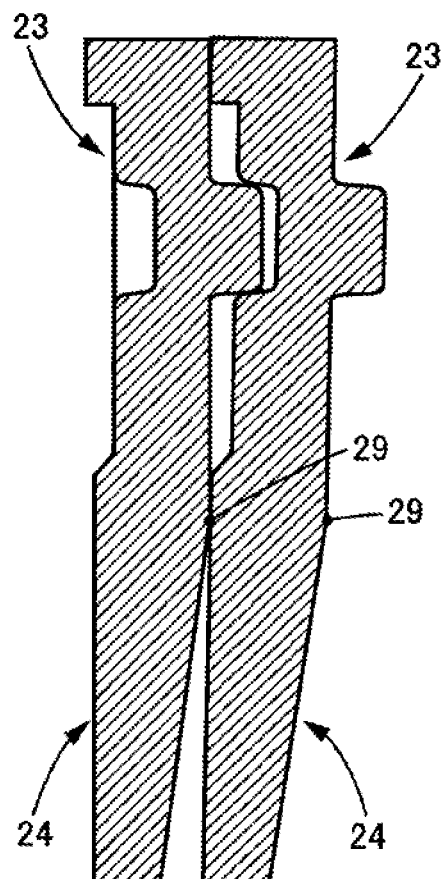

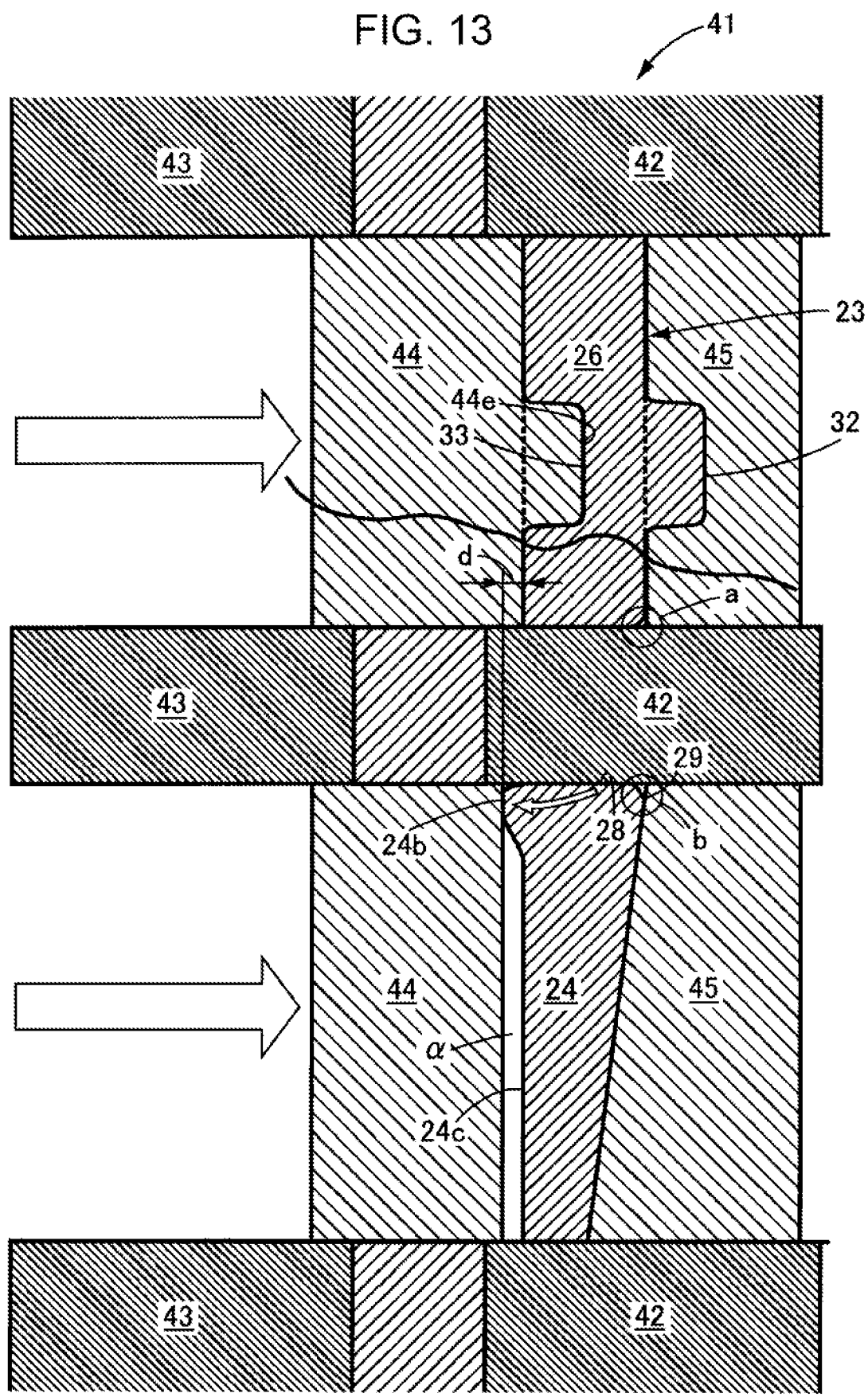

METAL ELEMENT FOR CONTINUOUSLY VARIABLE TRANSMISSION AND METHOD OF MANUFACTURE THE SAME

CROSS REFERENCES TO RELATED APPLICATIONS

The present application claims priority under 35 U.S.C. § 119 to Japanese Patent Application No. 2018-071489, filed Apr. 3, 2018, entitled "Metal Element for Continuously Variable Transmission and Method of Manufacturing The Same." The contents of this application are incorporated herein by reference in their entirety.

BACKGROUND

1. Field

The present disclosure relates to a metal element for a continuously variable transmission, and a method of manufacturing the metal element. The metal element, which is pressed and punched by a mold, includes: a neck section positioned between a pair of right and left ring slots; an ear section continuous to a radially outer side of the neck section; and a body section continuous to a radially inner side of the neck section. A locking edge extending in a right-left direction is formed at a radially outer end of the front surface of the body section.

2. Description of the Related Art

A method of manufacturing a metal element to be used for the metal belt of a belt-type continuously variable transmission disclosed in Japanese Patent No. 4132820 is publicly known. In this method, a metal element material roughly molded into a shape close the shape of the product of the metal element. The metal element material is then pressed to be finished by a mold including a main punch and a counter punch. Thus, the accuracy of the shape of the vicinity of the locking edge of the metal element is increased while the durability of the mold is ensured.

A metal element to be used for the metal belt of a belt-type continuously variable transmission disclosed in International publication No. WO/2014/196254 is publicly known. In this metal element, the position of a locking edge is made to coincide with the position of the front edge of a saddle surface, which is the position of the radially outer end of the front surface of a body section of the metal element. A depressed section is formed on the back surface of a neck section and an ear section of the metal element. When the metal element on the back side is displaced outwardly in the radial direction relative to the metal element on the front side, an inclined surface of the body section of the metal element on the back side is brought into contact with the body section of the metal element on the front side over the entire length in the right-left direction, thereby reducing a bending load applied to the portion at which the neck section is connected to the body section and suppressing bending of the neck section.

When a metal element is pressed and punched by a mold including a main punch and a counter punch, and the metal element is barrel-polished to be deburred, a locking edge, which is a corner with an acute angle, is excessively polished, as compared with a flat ear section, and the thickness of the locking edge tends to be smaller than the thickness of the ear section. Thus, when a great number of metal elements in intimate contact with each other transmit a driving force at a chord portion of a metal belt wound around a drive pulley and a driven pulley, the chord of the metal belt is bent due to the difference in thickness between the thin locking edge and the thick ear section, and the transmission efficiency of the driving force may be reduced.

In consideration of the above-described situation, there is a need to provide a metal element and a method of manufacturing the metal element that enable the thickness balance between the ear section and the locking edge of the metal element to be adjusted.

SUMMARY

In a first aspect of the present disclosure, a metal element for a continuously variable transmission, which is pressed and punched by a mold, is provided, the metal element including: a neck section positioned between a pair of right and left ring slots; an ear section continuous to a radially outer side of the neck section; and a body section continuous to a radially inner side of the neck section. A locking edge extending in a right-left direction is formed at a radially outer end of a front surface of the body section, and the metal element includes a projection section extending in the right-left direction on a back surface of the body section at a position backward of the locking edge.

A second aspect of the present disclosure describes a position of a radially outer end of the projection section substantially coincides with a radial position of the locking edge.

A third aspect of the present disclosure describes the metal element includes a depressed section on a radially inner side of the projection section.

A fourth aspect of the present disclosure describes the mold includes a main punch which comes into contact with a back surface of the metal element, and a counter punch which comes into contact with a front surface of the metal element, and the main punch has one of a depressed section and a step section that shape the projection section.

A fifth aspect of the present disclosure describes a method of manufacturing the metal element according to the first aspect, in which the mold includes a main punch which comes into contact with a back surface of the metal element, and a counter punch which comes into contact with a front surface of the metal element, and a press surface of the main punch that shapes the ear section and the neck section projects forward more than a press surface of the main punch that shapes the body section, so as to shape the projection section.

A sixth aspect of the present disclosure describes a method of manufacturing the metal element according to the fourth aspect, in which when pressing is performed, the main punch has space between the back surface of the body section and the main punch, at a radially inward position of the projection section.

It is to be noted that the main punch 44 and the counter punch 45 in the embodiment correspond to the mold of the present disclosure.

According to a first aspect of the present disclosure, the metal element, which is pressed and punched by a mold, includes: the neck section positioned between a pair of right and left ring slots; the ear section continuous to a radially outer side of the neck section; and the body section continuous to a radially inner side of the neck section, and the locking edge extending in a right-left direction is formed at a radially outer end of a front surface of the body section. Since the metal element includes a projection section extending in the right-left direction on the back surface of the body section at a position backward of the locking edge, the locking edge of the front surface of the metal element on the back side comes into contact with the projection section of the back surface of the metal element on the front side, and thus the height of the projection section compensates for the insufficiency of the thickness of the locking edge relative to the thickness of the ear section, and it is possible to appropriately maintain the contact relationship between adjacent metal elements.

According to a second aspect of the present disclosure, the position of the radially outer end of the projection section substantially coincides with the radial position of the locking edge. Thus, the locking edge of the metal element 23 on the back side is brought into contact with the projection section of the metal element on the front side, and it is possible to effectively transmit the driving force.

According to a third aspect of the present disclosure, the metal element includes a depressed section on the radially inner side of the projection section. Thus, the depressed section makes it possible to ensure the space into which the material flows, and to reduce the pressing load for shaping the projection section.

According to a fourth aspect of the present disclosure, the mold includes a main punch which comes into contact with the back surface of the metal element, and a counter punch which comes into contact with the front surface of the metal element, and the main punch has a depressed section that shape the projection section. Thus, it is possible to form the projection section of the back surface of the body section easily.

According to a fifth aspect of the present disclosure, the mold includes a main punch which comes into contact with the back surface of the metal element, and a counter punch which comes into contact with a front surface of the metal element, and the press surface of the main punch that shapes the ear section and the neck section projects forward more than the press surface of the main punch that shapes the body section, so as to shape the projection section. Thus, it is possible to form the projection section of the back surface of the body section easily.

According to a sixth aspect of the present disclosure, when pressing is performed, the main punch has space between the back surface of the body section and the main punch, at a radially inward position of the projection section. Thus, the space makes it possible to ensure the space into which the material flows, and to reduce the pressing load for shaping the projection section.

BRIEF DESCRIPTION OF THE DRAWINGS

FIG. 6 is a perspective view of a metal element material (first embodiment).

FIG. 9A illustrates a contact state of adjacent metal elements (first embodiment) and FIG. 9B illustrates a contact state of adjacent metal elements (comparative example).

FIG. 13 is a cross-sectional view of a mold corresponding to a cross-section taken along line XIII-XIII of FIG. 11 (third embodiment).

DESCRIPTION OF THE PREFERRED EMBODIMENTS

First Embodiment

Hereinafter, a first embodiment of the present disclosure will be described with reference to FIGS. 1 to 9B.

Figure 1:
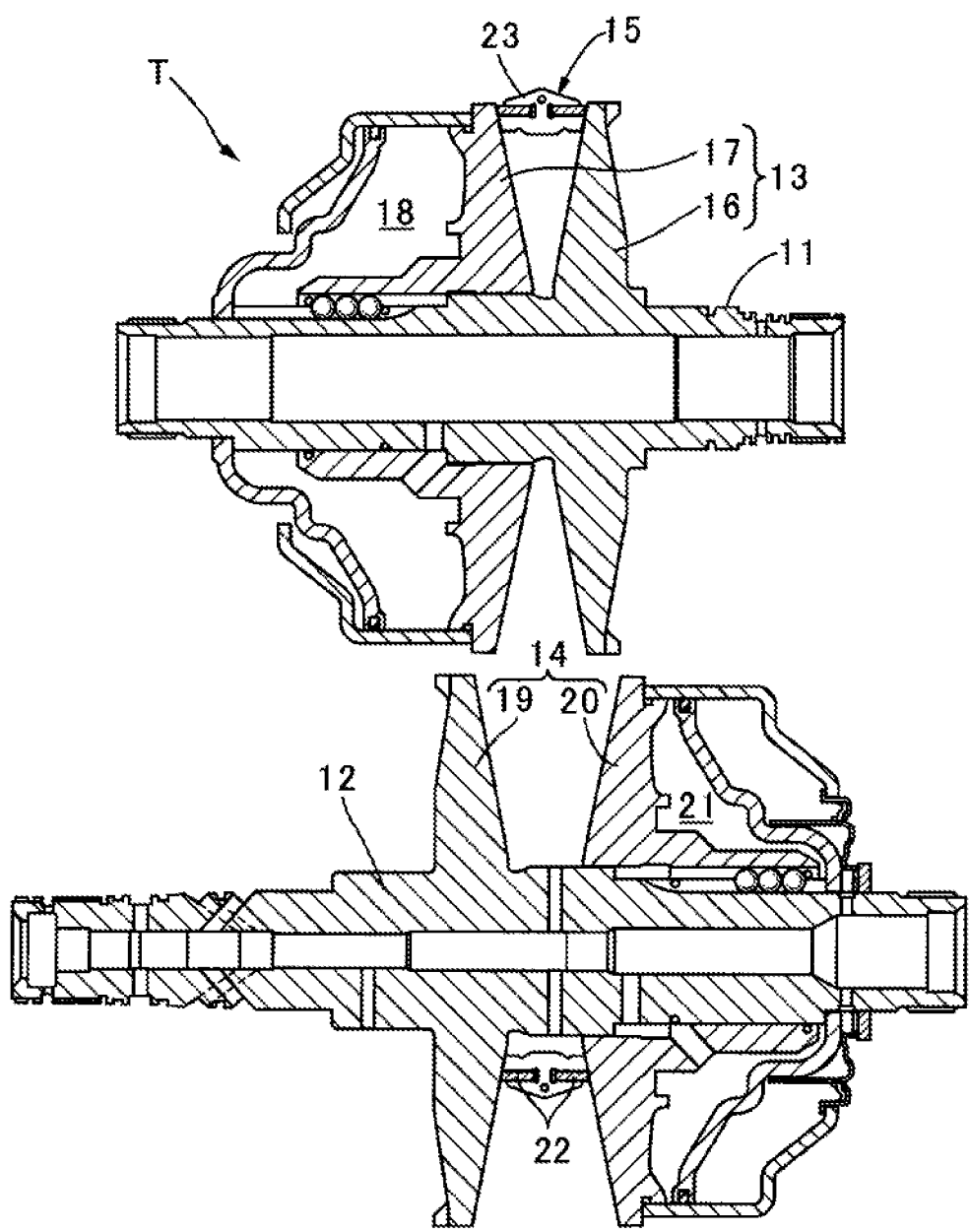
FIG. 1 is a view illustrating the overall configuration of a belt-type continuously variable transmission (first embodiment).

FIG. 1 illustrates a schematic structure of a belt-type continuously variable transmission T mounted on an automobile. The belt-type continuously variable transmission T includes a drive shaft 11 connected to an engine, and a driven shaft 12 connected to a drive wheel, and an endless metal belt 15 is wound around a drive pulley 13 provided in the drive shaft 11 and a driven pulley 14 provided in the driven shaft 12. The drive pulley 13 includes a fixed half-pulley 16 fixed to the drive shaft 11, and a movable half-pulley 17 which is movable toward and away from the fixed half-pulley 16, and the movable half-pulley 17 is urged toward the fixed half-pulley 16 by the hydraulic pressure applied to an oil chamber 18. The driven pulley 14 includes a fixed half-pulley 19 fixed to the driven shaft 12, and a movable half-pulley 20 which is movable toward and away from the fixed half-pulley 19, and the movable half-pulley 20 is urged toward the fixed half-pulley 19 by the hydraulic pressure applied to an oil chamber 21.

Figure 2:
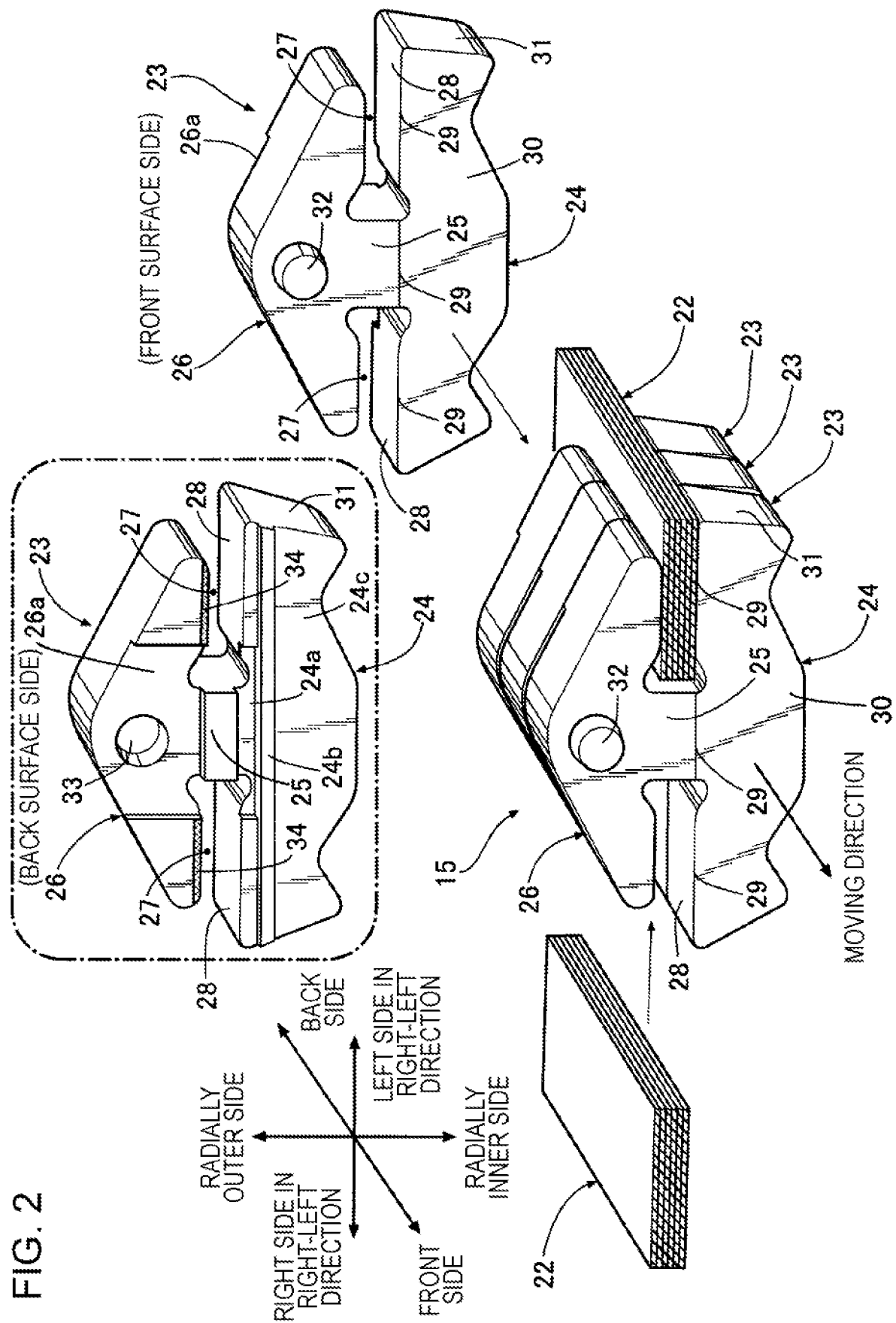
FIG. 2 is a perspective view of a metal belt and a metal element (first embodiment).
Figure 3:
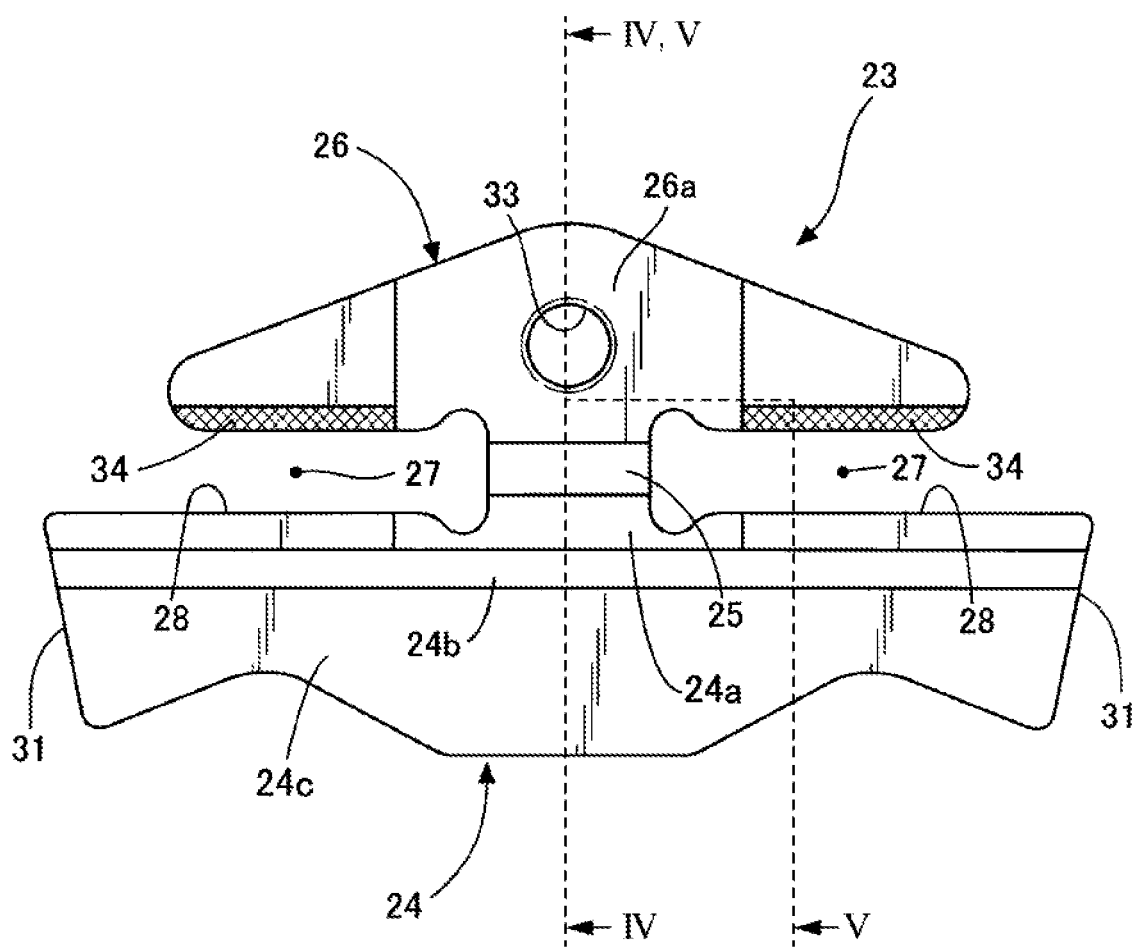
FIG. 3 is a rear view of the metal element (first embodiment).
Figure 4:
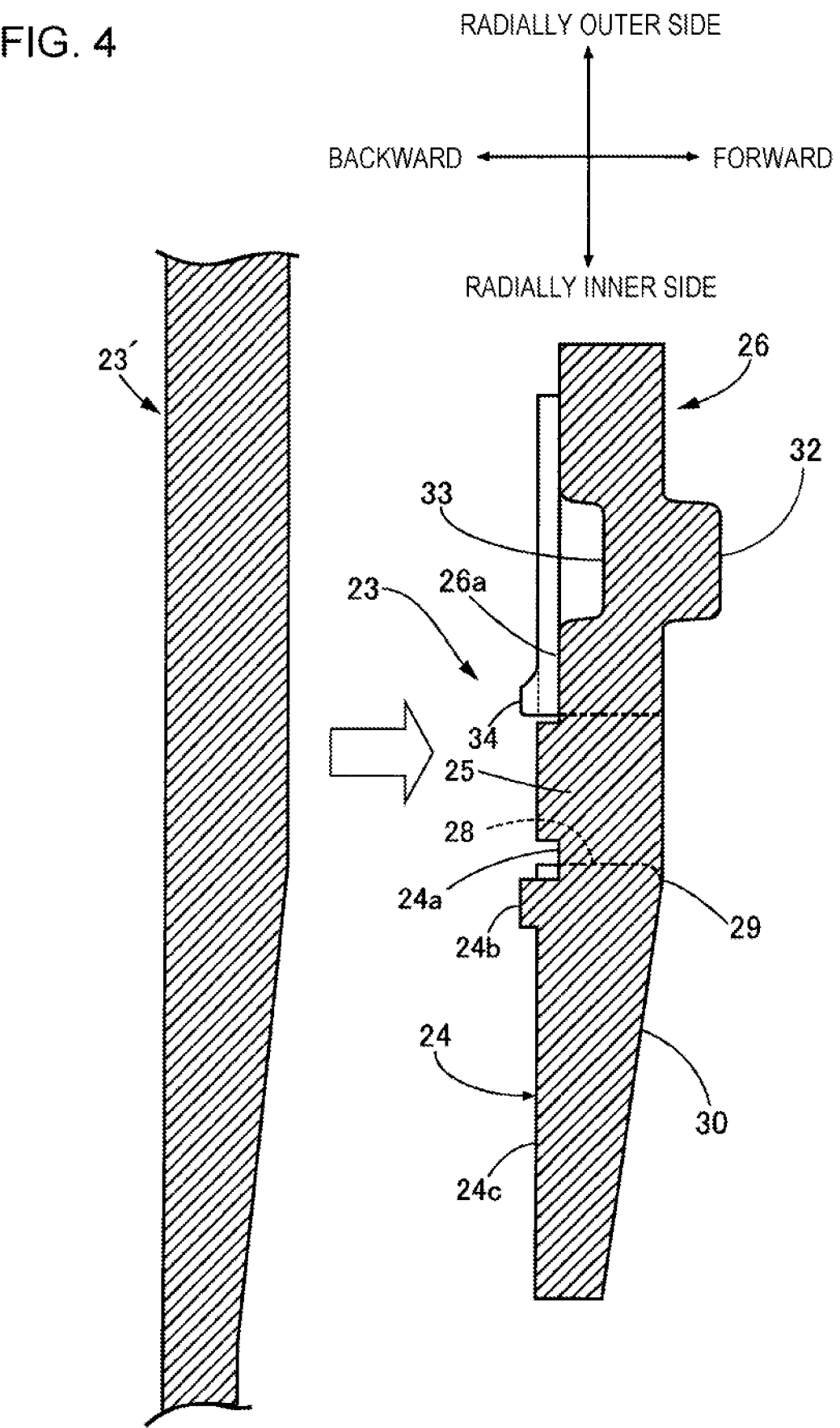
FIG. 4 is a cross-sectional view taken along line IV-IV of FIG. 3 (first embodiment).
Figure 5:
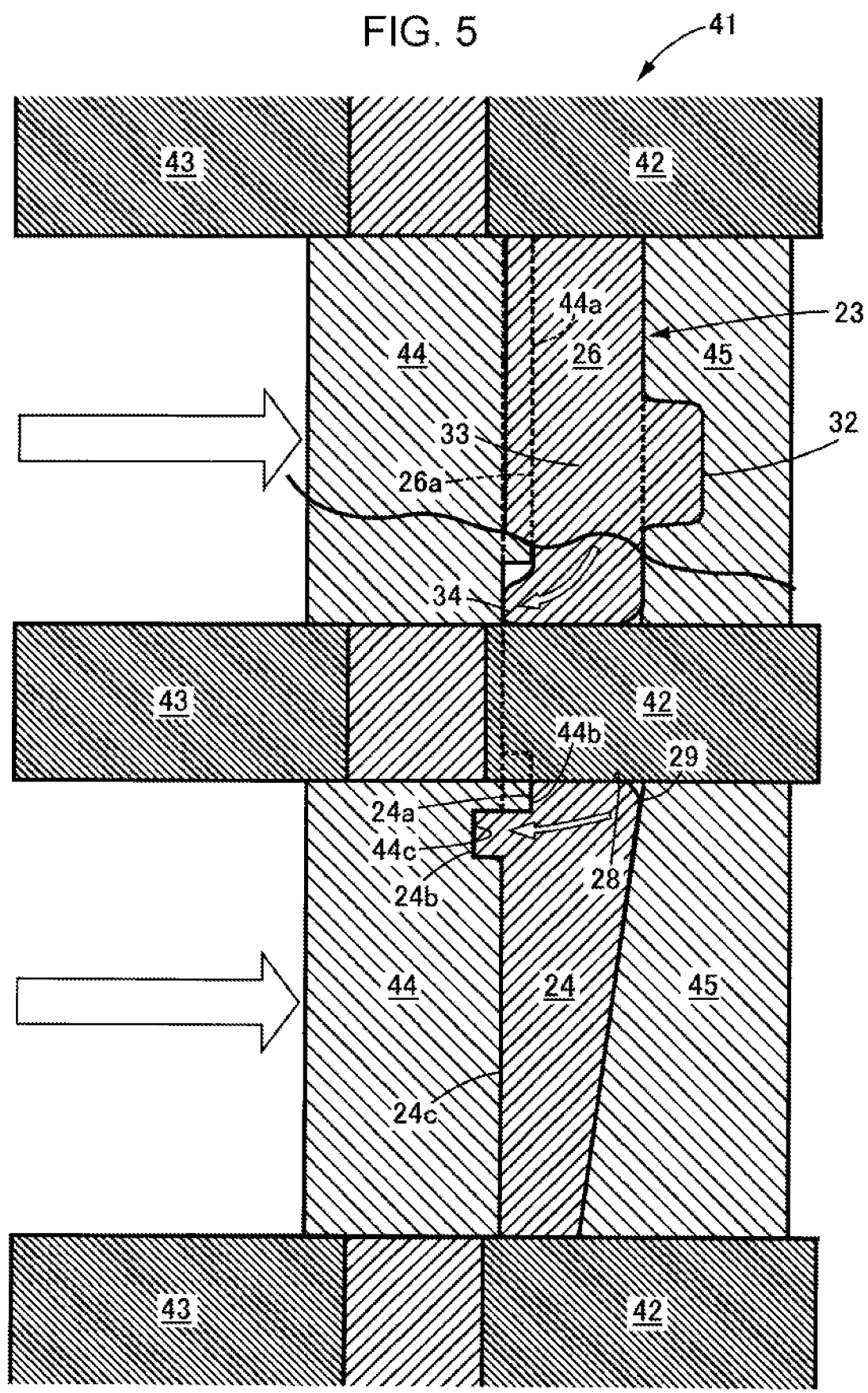
FIG. 5 is a cross-sectional view of a mold corresponding to a cross-section taken along line V-V of FIG. 3 (first embodiment).

As illustrated in FIGS. 2 and 3, a metal belt 15 includes a pair of right and left metal rings 22, and a great number of metal elements 23 that support the pair of metal rings 22. In the present application, the forward direction with respect to a front-back direction is defined as the direction in which the metal belt 15 runs, the outer side in a radial direction is defined as the outer circumferential side of the drive pulley 13 and the driven pulley 14 with the metal belt 15 wound around the drive pulley 13 and the driven pulley 14, and the right-left direction is defined as the direction perpendicular to the front-back direction and the radial direction. Also, for a metal element material 23' (see FIG. 6) which is the material of the metal elements 23, and a punching device 41 (see FIGS. 5 and 7A to 7C) that molds and punches the metal element 23 from the metal element material 23', the front-back direction, the radial direction, and the right-left direction are each defined as a corresponding one of the front-back direction, the radial direction, and the right-left direction of the metal element 23.

Each metal element 23 manufactured from the metal element material 23' includes a body section (a body portion) 24 extending in the right-left direction, a neck section (a neck portion) 25 extending radially outward from the center in the right-left direction of the body section 24, and a substantially triangular ear section (a substantially triangular ear portion) 26 connected to the radially outer end of the neck section 25. A pair of ring slots 27, which opens outward in the right-left direction and in which the metal rings 22 fit, is formed between the body section 24, the neck section 25, and the ear section 26. Saddle surfaces 28, on which the inner circumferential surfaces of the metal rings 22 are seated, are formed at respective radially outer ends of the body section 24 which faces the ring slots 27. A locking edge 29 extending in the right-left direction is formed at the radially outer end of the front surface of the body section 24. An inclined surface 30, which is inclined radially inwardly and backward from the locking edge 29, is formed on the front surface of the body section 24. The locking edge 29 overlaps with the front edge of the saddle surfaces 28, and thus the locking edge 29 is located at the radially outer end of the front surface of the body section 24.

Pulley contact surfaces 31, which are in contact with the V surface of the drive pulley 13 and the driven pulley 14, are formed at both ends in the right-left direction of the body section 24 of the metal element 23. In addition, a frustum-shaped nose 32, which may be fitted in a frustum-shaped hole 33 formed on the back surface of the ear section 26, is formed on the front surface of the ear section 26 of the metal element 23.

In addition, a depressed section (a depressed portion) 26a is formed to surround the hole 33 at the central portion in the right-left direction of the back surface of the ear section 26 of the metal element 23, and a depressed section 24a smaller than the depressed section 26a is formed at a central portion in the right-left direction of the radially outer end of the back surface of the body section 24 continuous to the radially inner side of the neck section 25. Also, bulging sections (bulging portions) 34 extending in the right-left direction and projecting backward are formed at the radially inner ends of the ear section 26 continuous to both sides in the right-left direction of the depressed section 26a surrounding the hole 33, in other words, at the positions facing the radially outer ends of the ring slots 27. Furthermore, a projection section (a projection portion) 24b extending in the right-left direction parallel to the locking edge 29 is formed on the radially inner side of the depressed section 24a of the back surface of the body section 24. As a result, a depressed section 24c lower than the projection section 24b is formed at a radially inward position of the projection section 24b in the body section 24.

As illustrated in FIGS. 5 and 7A to 7F, the punching device 41 that molds and punches the metal element 23 from the metal element material 23' includes dies 42 and holding plates 43 that hold and fix the metal element material 23' in the front-back direction; a main punch 44 which slidably fits in a hole formed in each die 42, and comes into contact with the back surface of the metal element 23, the hole having the same outer shape of the metal element 23; and a counter punch 45 which slidably fits in a hole having the same outer shape of the metal element 23, and comes into contact with the front surface of the metal element 23. The main punch 44 and the counter punch 45 are relatively movable in the front-back direction with respect to the dies 42 and the holding plates 43 by a hydraulic pressure cylinder which is not illustrated.

On the front surface of the main punch 44, projection sections 44a, 44b for forming the depressed sections 26a, 24a on the back surface of the metal element 23 are provided, and a depressed section 44c for forming the projection section 24b is formed. It is to be noted that the thickness of the metal element 23 in the front-back direction is, for instance, approximately 1.5 mm, the height of the projection sections 44a, 44b is, for instance, approximately 0.02 mm, and the depth of the depressed section 44c is smaller than 0.02 mm.

Next, the first embodiment having the above-described configuration of the present disclosure will be described.

Figure 7A:
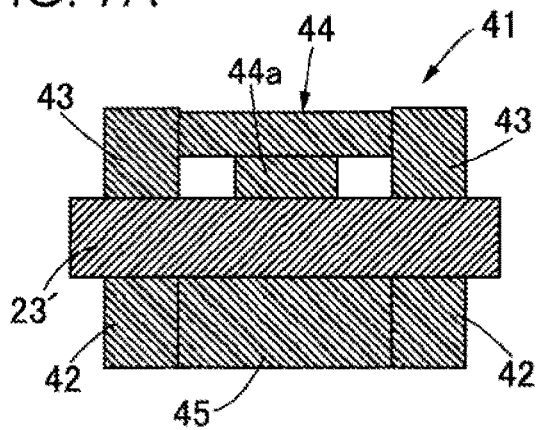
FIGS. 7A to 7F are schematic operation explanatory diagrams of a punching device (first embodiment).

As illustrated in the embodiment of FIGS. 5 and 7A to 7C, first, the metal element material 23' is held and fixed between the dies 42 and the holding plates 43 of the punching device 41 (see FIG. 7A). Subsequently, while pressing is performed by compressing the metal element material 23' between the main punch 44 and the counter punch 45 in the front-back direction, the main punch 44 and the counter punch 45 are moved relative to the dies 42 and the holding plates 43, thereby forming the nose 32 and the hole 33 as well as the depressed sections 26a, 24a, and the projection section 24b of the metal element 23 using the projection sections 44a, 44b, and the depressed section 44c of the main punch 44 (see FIG. 7B). The material, which is pressed out from the depressed sections 26a, 24a by the projection sections 44a, 44b, flows outwardly in the right-left direction, is elevated backward at the radially inner edge of the ear section 26, and thus the bulging sections 34 project along the radially inner edge of the ear section 26. At this point, the load, by which the counter punch 45 is urged toward the main punch 44, is set to a lower level than the level in related art, and thus space α remains between the metal element material 23' and the main punch 44 in the vicinity the bulging sections 34 (see FIGS. 7B and 7C).

Furthermore, in the pressing step described above, part of the material, which is pressed out from the depressed section 24a by the projection section 44b of the main punch 49, flows into the depressed section 44c of the main punch 49, thus the projection section 24b extending in the right-left direction is formed at the radially outer side position of the back surface of the body section 24.

Subsequently, when the main punch 44 and the counter punch 45 are integrally further moved relative to the dies 42 and the holding plates 43, the metal element 23 is punched by shearing from the metal element material 23'. At this point, press sag is generated at the radially inner end of the front surface of the ear section 26 sheared by the counter punch 45 and the dies 42, and the radially inner end (locking edge 29) of the front surface of the body section 24. However, the material, which is pressed out by the press sag, flows to the back surface of the metal element 23, and promotes formation of the bulging section 34 and the projection section 24b. The metal element 23 molded in this manner includes the bulging section 34 (see FIGS. 3 to 5) projecting backwardly along the radially inner edge of the back surface of the ear section 26, and the projection section 24b (see FIGS. 3 to 5) projecting backwardly along the back side of the locking edge 29 of the body section 24.

Figure 7D:
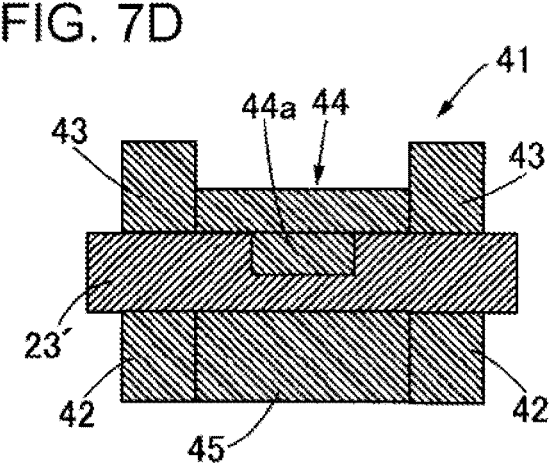
Figure 7B:
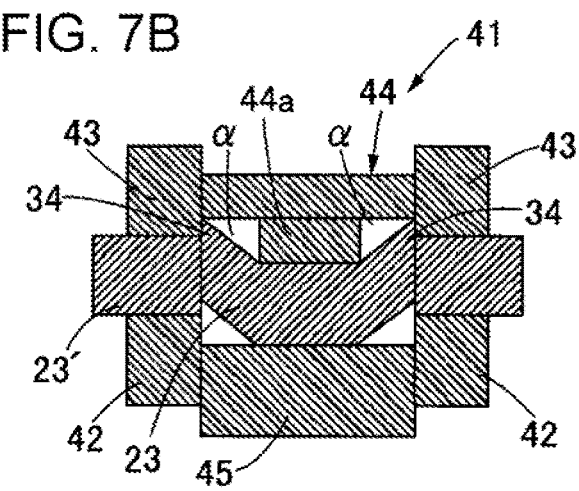
Figure 7E:
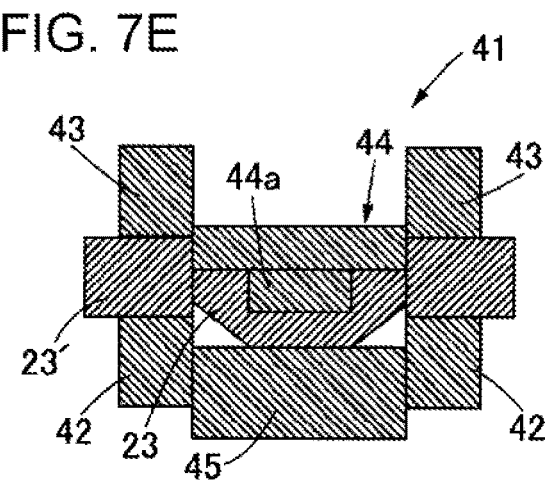
Figure 7C:
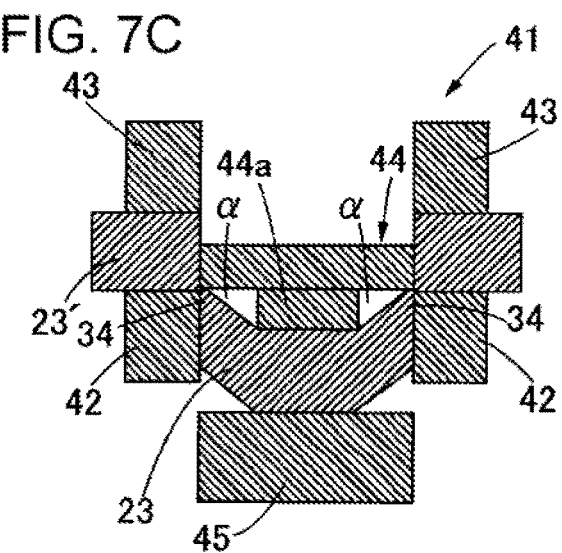
Figure 7F:
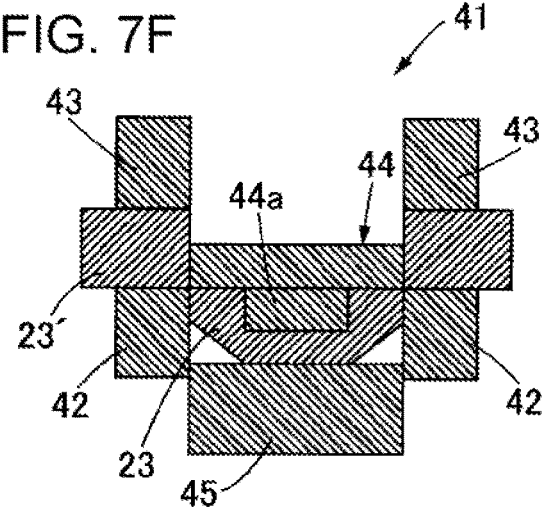

In contrast, in a related art example of FIGS. 7D to 7F, when pressing is performed by compressing the metal element material 23' between the main punch 44 and the counter punch 45 in the front-back direction, the load, by which the counter punch 45 is urged toward the main punch 44, is set to a higher level than the level in the embodiment, thus the projection sections 44a, 44b of the main punch 44 completely enter the inside of the metal element material 23'. Therefore, space a is not created between the metal element material 23' and the main punch 44, and not only the bulging section 34 generated in the embodiment is not formed (see FIG. 7D), but also the projection section 24b in the embodiment is not formed.

Subsequently, when the main punch 44 and the counter punch 45 are integrally moved relative to the dies 42 and the holding plates 43, the metal element 23 is punched by shearing from the metal element material 23' (see FIGS. 7E and 7F). At this point, since press sag is generated at the locking edge 29 portion of the metal element 23, the position of the locking edge 29 is slightly moved to radially inward, and the radial position of the locking edge 29 substantially coincides with the position of the radially outer end of the projection section 24b. Consequently, the locking edge 29 of the metal element 23 on the back side comes into contact with a projection section 23b of the metal element 23 on the front side, thus it is possible to effectively transmit the driving force.

Thus, in the embodiment, when the metal element 23 is press-molded by the main punch 44 and the counter punch 45, the load of the counter punch 45 is set low to create space α between the metal element material 23' and the main punches 44. Thus, it is possible to reliably form the bulging section 34. In addition, the load received by the main punch 44 and the counter punch 45 is reduced, and thus the durability of the punching device 41 is improved.

FIGS. 9A and 9B each illustrate a contact state of two metal elements 23, 23 overlapping in the front-back direction.

As illustrated in FIG. 9B, in a comparative example in which the projection section 24b is not formed on the back surface of the body section 24, the locking edge 29 on the front surface of the metal element 23 on the back side is in contact with the flat back surface of the body section 24 of the metal element 23 on the front side. However, in the embodiment in which the back surface of the body section 24 has the projection section 24b, as illustrated in FIG. 9A, the vicinity of the locking edge 29 of the front surface of the metal element 23 on the back side is in contact with the radially outer end of the projection section 24b of the back surface of the body section 24 of the metal element 23 on the front side. Consequently, the postures of the adjacent metal elements 23, 23 is maintained parallel, and the power transmission performance at the chord portion on the drive side of the metal belt is ensured.

Figure 8A:
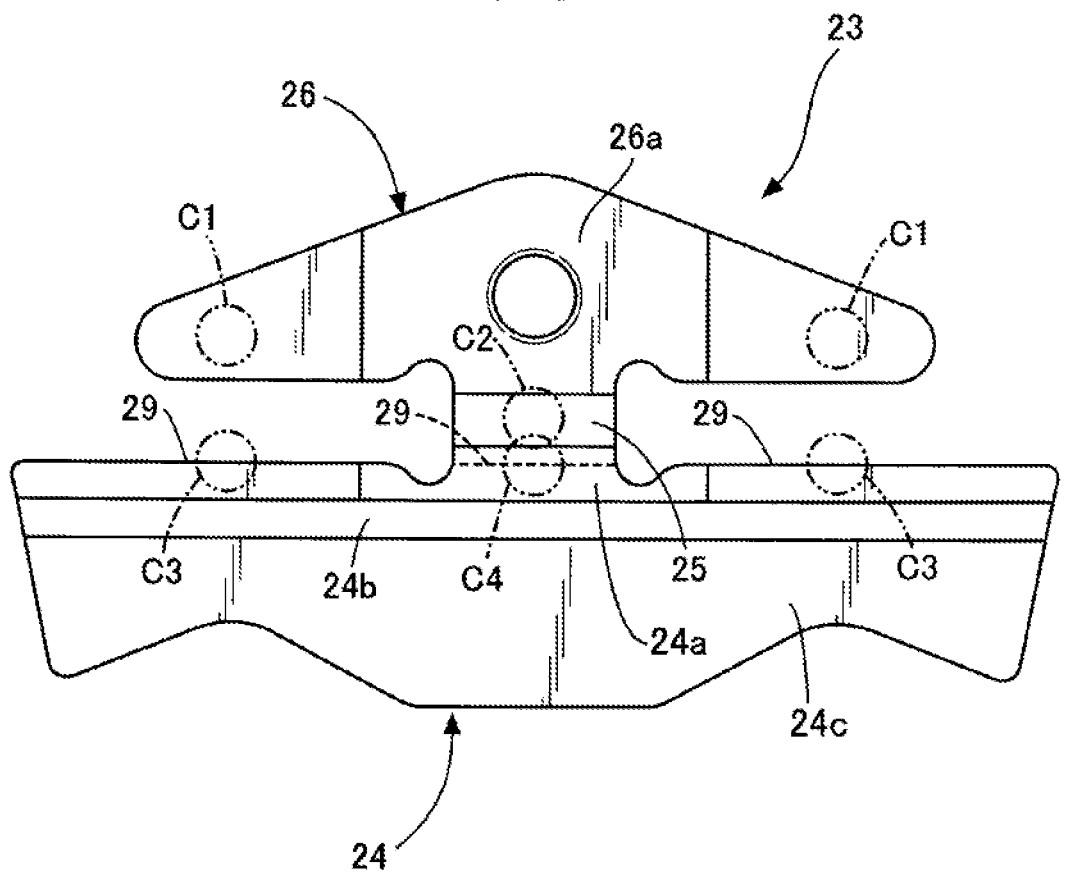
FIG. 8A is a view illustrating respective sections of the metal element and FIG. 8B is a graph illustrating the amount of decrease in the thickness of the respective sections of the metal element due to barrel polishing (first embodiment).
Figure 8B:
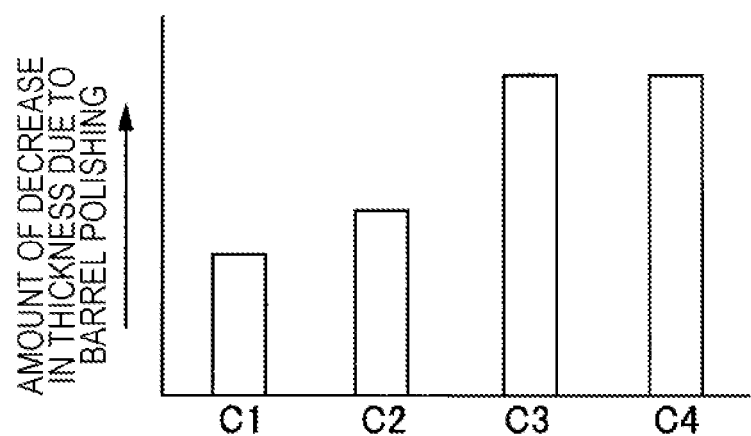

FIG. 8A illustrates each section of the metal element 23 and the graph of FIG. 8B illustrates the amount of decrease in the thickness of each section of the metal element 23 when being barrel polished after punching.

Outer sections C1 outwardly in the right-left direction of the depressed section 26a of the ear section 26 of the metal element 23, and a radially central portion C2 of the neck section 25 interposed between the depressed section 26a of the ear section 26 and the depressed section 24a of the body section 24 are plane sections and unlikely to wear out. Thus, the amount of decrease in thickness due to barrel polishing is small. On the other hand, sections C3, C4 corresponding to the locking edge 29 are in the vicinity of the locking edge 29 which is a corner, and are likely to wear out. Thus, the amount of decrease in thickness due to barrel polishing is large.

In the metal element 23 having no projection section 24b of the body section 24 in related art, before barrel polishing is performed, the thickness of the ear section 26 including the bulging section 34 and the thickness of the vicinity of the locking edge 29 of the body section 24 are set to be equal. However, when barrel polishing is performed, the thickness of the vicinity of the locking edge 29 of the body section 24 is more reduced than the thickness of the ear section 26 including the bulging section 34. Thus, the thickness of the vicinity of the locking edge 29 of a completed metal element 23 may be insufficient.

However, according to the embodiment, the projection section 24b is formed at the radially outer side section of the back surface of the body section 24 corresponding to the back side of the locking edge 29 of the metal element 23. Thus, it is possible to increase the thickness, once decreased by barrel polishing, of the vicinity of the locking edge 29, and to equalize the thicknesses of the ear section 26 and the body section 24, thereby making it possible to ensure the power transmission performance of the metal belt 15.

Moreover, according to the embodiment, the projection section 24b, which is a pressing section to which a large load is applied, projects more than other sections, the pressing section being pressed by the locking edge 29 of the metal element 23 on the back side. Thus, it is possible to increase the durability by efficiently lubricating and cooling the projection section 24b.

Second Embodiment

Figure 10:
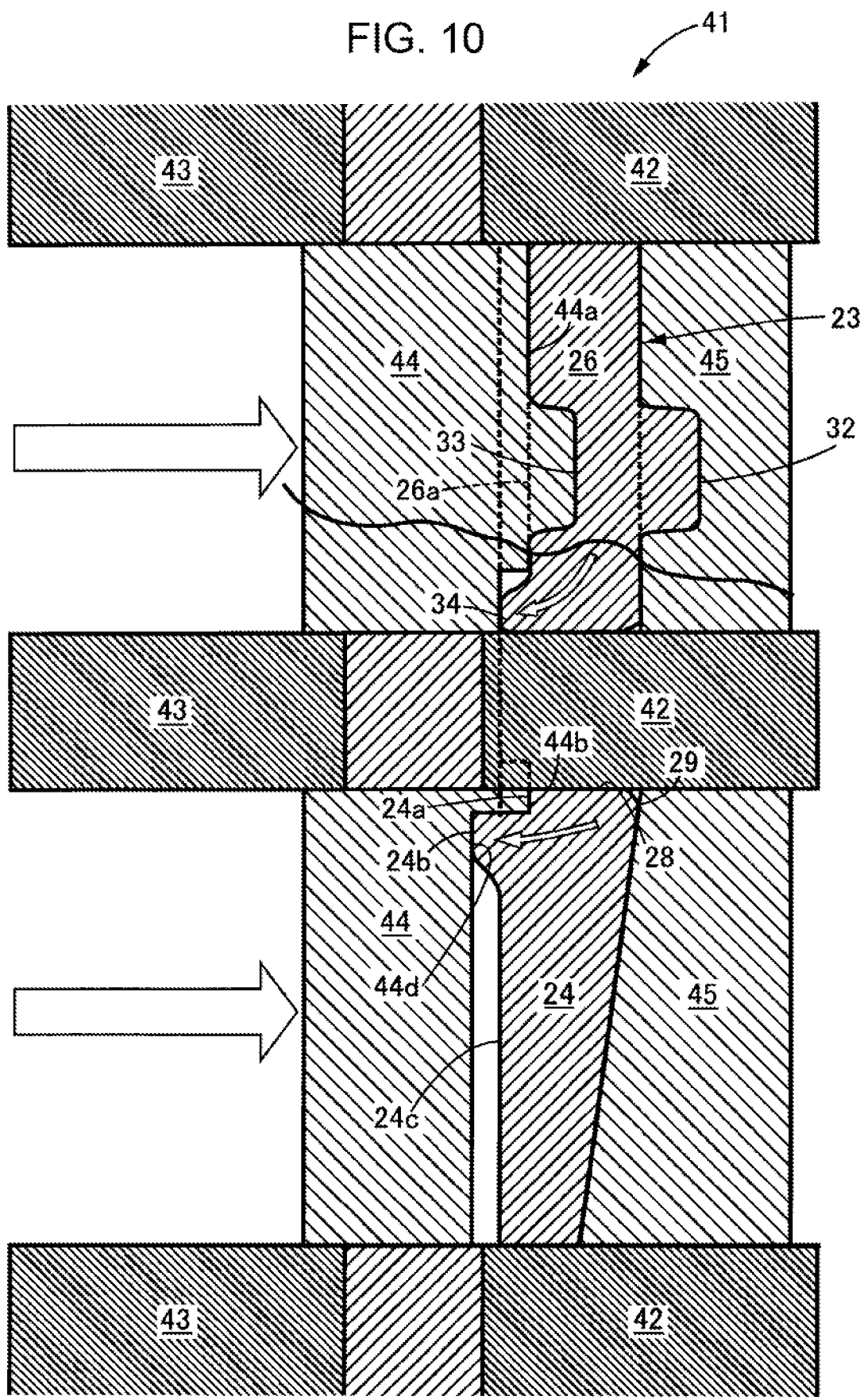
FIG. 10 is a view corresponding to FIG. 5 (second embodiment).

Next a second embodiment of the present disclosure will be described with reference to FIG. 10.

Although the main punch 44 in the first embodiment includes the depressed section 44c for forming the projection section 24b in the metal element 23, a step section 44d is formed instead of the depressed section 44c in the second embodiment. The step section 44d corresponds to the depressed section 44c that is extended to a position equivalent to the radially inner end of the body section 24 of the metal element 23. The material, which is pressed out at the time of pressing the metal element 23, flows into the radially outer end section of the step section 44d only, and thus it is possible to form the projection section 24b extending in the right-left direction at the position of the radially outer end of the body section 24 of the metal element 23.

According to the embodiment, space is present between the press surface of the main punch 44 and the depressed section 24c of the body section 24 at the time of press molding. Thus, it is possible to reduce the pressing load when the material, of which the projection section 24b is composed, flows into the space.

Third Embodiment

Next, a third embodiment of the present disclosure will be described with reference to FIGS. 11 to 13.

Figure 11:
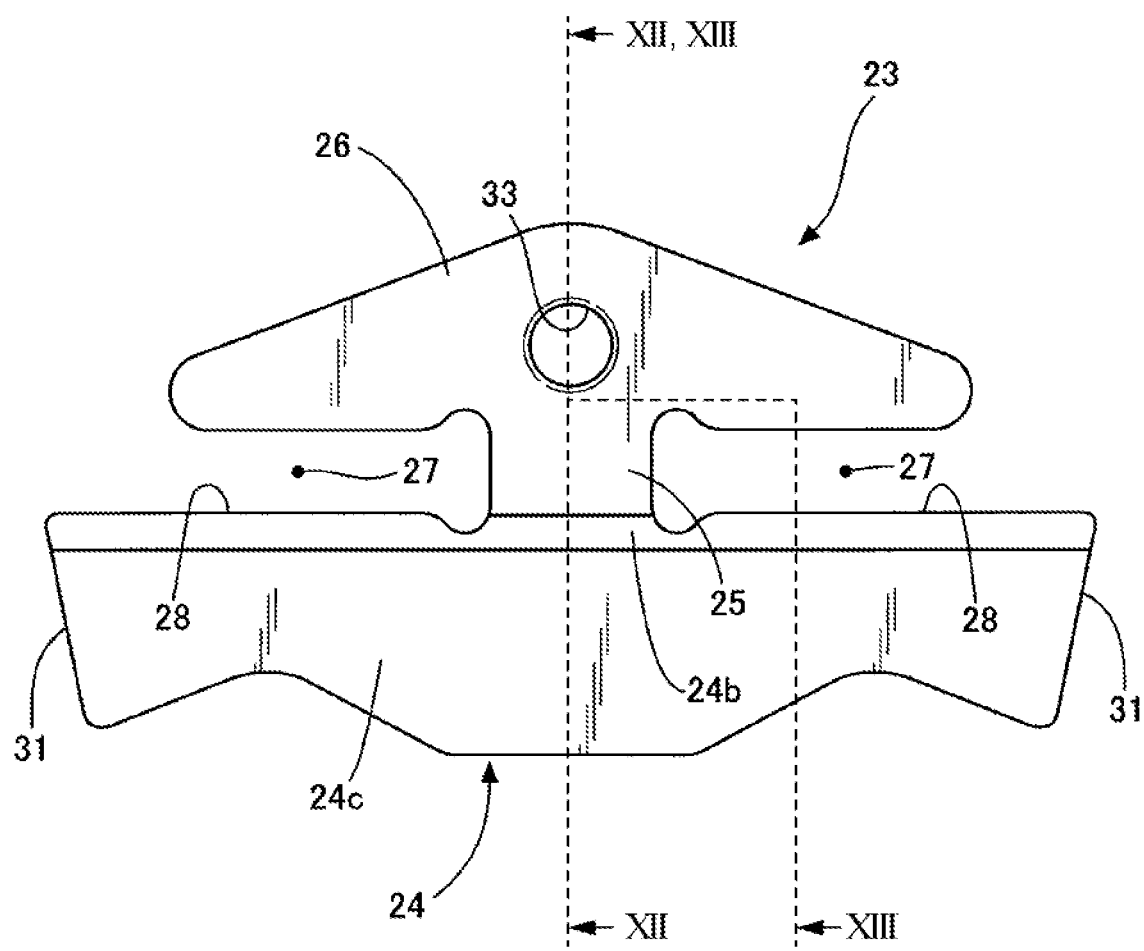
FIG. 11 is a rear view of a metal element (third embodiment).
Figure 12:
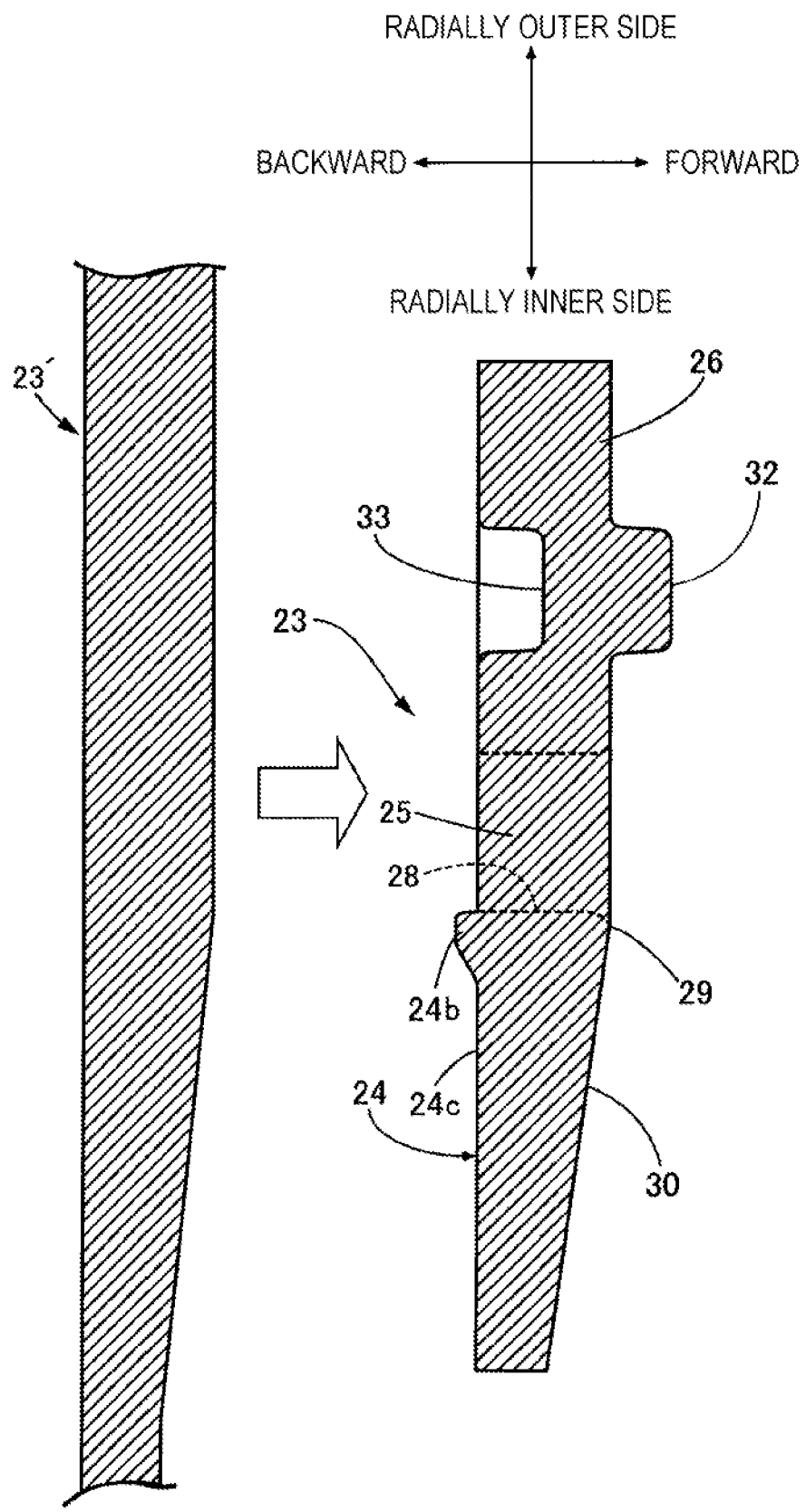
FIG. 12 is a cross-sectional view taken along line XII-XII of FIG. 11 (third embodiment).

As illustrated in FIGS. 11 and 12, the back surface of the metal element 23 in the third embodiment includes the hole 33 at the center of the ear section 26, and the projection section 24b at the radially outer end of the body section 24, and the other sections are flat. In the embodiment, the function of the projection section 24b of the body section 24 is the same as the function of the projection section 24b of the body section 24 in the first and second embodiments, and the function compensates for decrease in the thickness of the vicinity of the locking edge 29 when barrel polishing is performed, and reduces the difference between the thicknesses of the ear section 26 and the body section 24.

As illustrated in FIG. 13, the punching device 41 in the embodiment has a feature in the press surface of the main punch 44, which machines the back surface of the metal element 23.

The metal element 23 in the embodiment does not have the depressed section 26a (see FIG. 3) of the ear section 26 of the metal element 23 in the first and second embodiments. Thus, the radially outer side section of the main punch 44, in other words, a portion of the main punch 44 for pressing the back surface of the ear section 26 and a net member 16 is formed flat except for the projection 44e which shapes the hole 33 of the ear section 26. Also, the metal element 23 in the embodiment does not have the depressed section 24a (see FIG. 3) of the body section 24 of the metal element 23 in the first and second embodiments. Thus, the radially inward section of the main punch 44, in other words, a portion for pressing the back surface of the body section 24 is formed flat. However, the radially outer side section of the main punch 44 projects forward more than the radially inward section by a distance d.

When the metal element material 23' is press-molded by the main punch 44 and the counter punch 45, the back surface of the ear section 26 and the net member 16 of the metal element 23 comes into contact with the press surface of the main punch 44 to be pressed. However, the back surface of the body section 24 of the metal element 23 does not come into contact with the press surface of the main punch 44, and space α is formed. Subsequently, when the main punch 44 and the counter punch 45 are further advanced relative to the dies 42 and the holding plates 43 and the metal element 23 is punched from the metal element material 23', the radially inner end (see a section of FIG. 13) of the front surface of the ear section 26, and the radially outer end (see b section of FIG. 13) of the front surface of the body section 24 in which the dies 42 penetrate, are dragged by the dies 42, and press sag is generated. Then the material in the portion of the press sag is pressed out to the back surface of the metal element 23.

At this point, although the material, which is pressed out from the radially inner end a of the front surface of the ear section 26, flows backward, no projection section is formed on the back surface of the ear section 26 because the back surface of the ear section 26 is in intimate contact with the press surface of the main punch 44. However, space α is formed between the back surface of the body section 24 and the main punch 44, thus the material, which is pressed out from the radially outer end section b of the front surface of the body section 24, flows into space α, and the projection section 24b is formed at the radially outer end of the back surface of the body section 24.

Therefore, by the formation of the projection section 24b, it is possible to compensate for the decrease in the thickness of the vicinity of the locking edge 29 of the metal element 23 when barrel polishing is performed, and to reduce the difference between the thicknesses of the ear section 26 and the body section 24. Moreover, space α for forming the depressed section 24c is provided between the back surface of the body section 24 and the main punches 44, thus space α makes it possible to ensure the space into which the material flows, and to reduce the pressing load.

In the embodiment, it is not necessary to form the depressed section 26a of the back surface of the ear section 26 of the metal element 23, and the depressed section 24a of the back surface of the body section 24 in the first and second embodiments. Thus, when the metal element 23 is press-molded, the load of the counter punch 45 does not have to be set low.

Although the embodiments of the present disclosure have been described above, various design changes may be made in the scope without departing from the spirit of the present disclosure.

For instance, in the first and second embodiments, the back surface of the ear section 26 of the metal element 23 includes the bulging section 34, and the balance between thicknesses of the metal element 23 is adjusted by the bulging section 34 and the projection section 24b of the back surface of the body section 24. However, the bulging section 34 is not necessarily needed, and the thickness balance may be adjusted by the projection section 24b of the body section 24 only.

What is claimed is:

1. A metal element for supporting a rotating belt of a continuously variable transmission, which is produced by pressing and punching by a mold, the metal element comprising:
a neck portion positioned between a pair of right and left ring slots in which the belt is to be located;
an ear portion continuously extending from the neck portion in a right-left direction and at a radially outer side of the neck portion; and
a body portion continuously extending from the neck portion in the right-left direction and at a radially inner side of the neck portion and having a front surface and a back surface with respect to a rotating direction of the metal element, the body portion comprising a locking edge extending in the right-left direction and formed at a radially outer end of the front surface of the body portion,
wherein the metal element comprises a projection portion extending in the right-left direction and projected backward from the back surface of the body portion such that the projection portion is positioned backward of the locking edge in the rotating direction, the projection portion being integrally formed with the body portion, and
wherein the metal element comprises a depressed portion at a radially inner side of the projection portion.

2. The metal element according to claim 1,
wherein a position of a radially outer end of the projection portion substantially coincides with a radial position of the locking edge.

3. A method of manufacturing a metal element, comprising pressing and punching a metal element material by a mold to produce the metal element of claim 1,
wherein the mold comprises a main punch which comes into contact with a back surface of the metal element, and a counter punch which comes into contact with a front surface of the metal element, and the main punch has one of a depressed portion and a step portion that shape the projection portion which is projected backward from the back surface of the body portion and integrally formed with the body portion.

4. A method of manufacturing a metal element, comprising pressing and punching a metal element material by a mold to produce the metal element of claim 1
wherein the mold comprises a main punch which comes into contact with a back surface of the metal element, and a counter punch which comes into contact with a front surface of the metal element, and a press surface of the main punch that shapes the ear portion and the neck portion projects forward more than a press surface of the main punch that shapes the body portion, so as to shape the projection portion which is projected backward from the back surface of the body portion and integrally formed with the body portion.

5. A method of manufacturing a metal element for supporting a rotating belt of a continuously variable transmission, the metal element comprising:
a neck portion positioned between a pair of right and left ring slots in which the belt is to be located;
an ear portion continuously extending from the neck portion in a right-left direction and at a radially outer side of the neck portion; and a body portion continuously extending from the neck portion in the right-left direction and at a radially inner side of the neck portion and having a front surface and a back surface with respect to a rotating direction of the metal element, the body portion comprising a locking edge extending in the right-left direction and formed at a radially outer end of the front surface of the body portion, wherein the metal element comprises a projection portion extending in the right-left direction and formed at the back surface of the body portion such that the projection portion is positioned backward of the locking edge in the rotating direction, the method comprising pressing and punching a metal element material by a mold, wherein the mold comprises a main punch which comes into contact with a back surface of the metal element, and a counter punch which comes into contact with a front surface of the metal element, and the main punch has one of a depressed portion and a step portion that shape the projection portion, and wherein when the pressing is performed, the main punch has space between the back surface of the body portion and the main punch, at a radially inward position of the projection portion.

6. A method of manufacturing a metal element for supporting a rotating belt of a continuously variable transmission, the metal element comprising:

a neck portion positioned between a pair of right and left ring slots in which the belt is to be located;

an ear portion continuously extending from the neck portion in a right-left direction and at a radially outer side of the neck portion; and a body portion continuously extending from the neck portion in the right-left direction and at a radially inner side of the neck portion and having a front surface and a back surface with respect to a rotating direction of the metal element, the body portion comprising a locking edge extending in the right-left direction and formed at a radially outer end of the front surface of the body portion, wherein the metal element comprises a projection portion extending in the right-left direction and formed at the back surface of the body portion such that the projection portion is positioned backward of the locking edge in the rotating direction, the method comprising pressing and punching a metal element material by a mold, wherein the mold comprises a main punch which comes into contact with a back surface of the metal element, and a counter punch which comes into contact with a front surface of the metal element, and a press surface of the main punch that shapes the ear portion and the neck portion projects forward more than a press surface of the main punch that shapes the body portion, so as to shape the projection portion, and wherein when the pressing is performed, the main punch has space between the back surface of the body portion and the main punch, at a radially inward position of the projection portion.

7. The metal element according to claim 1, wherein the projection portion extends from one edge to another edge of the body portion in the right-left direction.

* * * * *